US012800005B2

(12) United States Patent
Birkey et al.

(10) Patent No.: US 12,800,005 B2
(45) Date of Patent: Nov. 17, 2026

(54) SYSTEM AND METHOD TO RESTRICT GAS BACKFLOW DURING REBOUND DAMPING

(71) Applicant: Textron Aviation Inc., Wichita, KS (US)

(72) Inventors: Justin Birkey, Wichita, KS (US); Raymond Charters Maple, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 473 days.

(21) Appl. No.: 18/590,458

(22) Filed: Feb. 28, 2024

(65) Prior Publication Data

US 2024/0295251 A1 Sep. 5, 2024

Related U.S. Application Data

(60) Provisional application No. 63/488,230, filed on Mar. 3, 2023.

(51) Int. Cl.
*F16F 9/49* (2006.01)
*B64C 25/58* (2006.01)

(52) U.S. Cl.
CPC ................ *F16F 9/49* (2013.01); *B64C 25/58* (2013.01); *F16F 2222/126* (2013.01); *F16F 2230/16* (2013.01)

(58) Field of Classification Search
CPC .... F16F 9/49; F16F 2222/126; F16F 2230/16; B64C 25/58
See application file for complete search history.

(56) References Cited

U.S. PATENT DOCUMENTS

| | | | | |
|---|---|---|---|---|
| 9,650,128 | B2 | 5/2017 | Fenny et al. | |
| 10,689,098 | B2 | 6/2020 | Waltner | |
| 10,914,402 | B2 | 2/2021 | Merrill | |
| 11,204,075 | B2 * | 12/2021 | Juracek | F16F 9/516 |
| 2018/0079494 | A1 | 3/2018 | Cottet et al. | |
| 2019/0309817 | A1 * | 10/2019 | Juracek | F16F 9/3485 |
| 2021/0024203 | A1 | 1/2021 | Chappell et al. | |

FOREIGN PATENT DOCUMENTS

| | | | | |
|---|---|---|---|---|
| BR | 102018003330 B1 * | 8/2023 | | |
| DE | 2224629 A1 * | 11/1972 | | |
| EP | 1081408 A1 * | 3/2001 | | F16F 9/486 |

* cited by examiner

*Primary Examiner* — Vishal R Sahni
(74) *Attorney, Agent, or Firm* — Avek IP, LLC

(57) ABSTRACT

A gas backflow restrictor system as part of an aircraft strut includes the strut defining an inner volume having a first chamber and a second chamber; an orifice plate positioned within the inner volume and separating the first chamber and the second chamber; a standpipe attached to the orifice plate and extending longitudinally within the inner volume, the standpipe having openings extending through a thickness of a wall forming the standpipe, the standpipe further defining an inner channel; and a restrictor mounted within the inner channel, the restrictor having a shelf extending into the inner channel and forming a central opening; the shelf is to reduce gaseous flow through one or more of the openings of the standpipe and toward the orifice plate.

19 Claims, 6 Drawing Sheets

SYSTEM AND METHOD TO RESTRICT GAS BACKFLOW DURING REBOUND DAMPING

CROSS-REFERENCE TO RELATED APPLICATIONS

This application claims the benefit of priority of U.S. Provisional Patent Application No. 63/488,230, filed on Mar. 3, 2023, the disclosure of which is herein incorporated by reference in its entirety.

BACKGROUND

1. Field

Embodiments of the disclosure relate to aircraft landing gear, and in particular to a system and method to restrict gas backflow in an aircraft strut during rebound damping.

2. Related Art

Aircraft landing gear include shock absorbers which use a combination of gas and hydraulic fluid to reduce compression forces during landing. For example, U.S. Pat. No. 9,650,128 to Fenny et al. describes an aircraft landing gear that incorporates an oleo strut for shock absorption during landing. U.S. Pat. No. 10,689,098 to Waltner et al. describes an adaptive aircraft landing gear that may incorporate an oleo strut and may use a controller and various means to add or remove fluids from the strut to control the dampening of the landing gear. U.S. Patent Publication No. 2018/0079494 to Cottet et al. describes an aircraft landing gear that may incorporate an oleo strut and may use a metering pin positioned to meter the flow of fluids through the orifice plate to control fluid flow.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In embodiments, the present disclosure includes a gas backflow restrictor system as part of an aircraft strut. The strut defines an inner volume having a first chamber and a second chamber. An orifice plate is positioned within the inner volume and separates the first chamber and the second chamber. A standpipe is attached to the orifice plate and extends longitudinally within the inner volume, the standpipe has a plurality of openings extending through a thickness of a wall forming the standpipe and the standpipe further defines an inner channel. A restrictor is mounted within the inner channel, the restrictor has a shelf extending into the inner channel and forms a central opening. The shelf is configured to reduce gaseous flow through one or more of the plurality of openings of the standpipe and toward the orifice plate.

In other embodiments, the present disclosure includes a combination of an orifice plate and a gas back flow restrictor as part of an aircraft strut. The orifice plate is positioned within a cylinder of the aircraft strut and separates a first chamber from a second chamber. The gas backflow restrictor is coupled to the orifice plate and is positioned above the orifice plate within the cylinder, the gas backflow restrictor having a shelf extending inwardly to create a central opening. The shelf is configured to reduce gaseous flow toward the orifice plate during a compression phase of the aircraft strut to thereby reduce gaseous flow through the orifice plate during an extension phase.

In yet another embodiment, the present disclosure includes a method of restricting gas backflow in an aircraft strut during rebound damping. The method includes separating a first chamber of an inner volume from a second chamber of the inner volume within the aircraft strut with an orifice plate; and mounting a restrictor within the inner volume at a position above the orifice plate, the restrictor having a shelf extending inwardly and creating a central opening. When the aircraft strut is in a compression phase, the restrictor reduces gaseous flow toward the orifice plate to thereby reduce gaseous flow through the orifice plate in an expansion phase.

BRIEF DESCRIPTION OF THE DRAWING FIGURES

Embodiments of the invention are described in detail below with reference to the attached drawing figures, wherein.

Figure 1A:
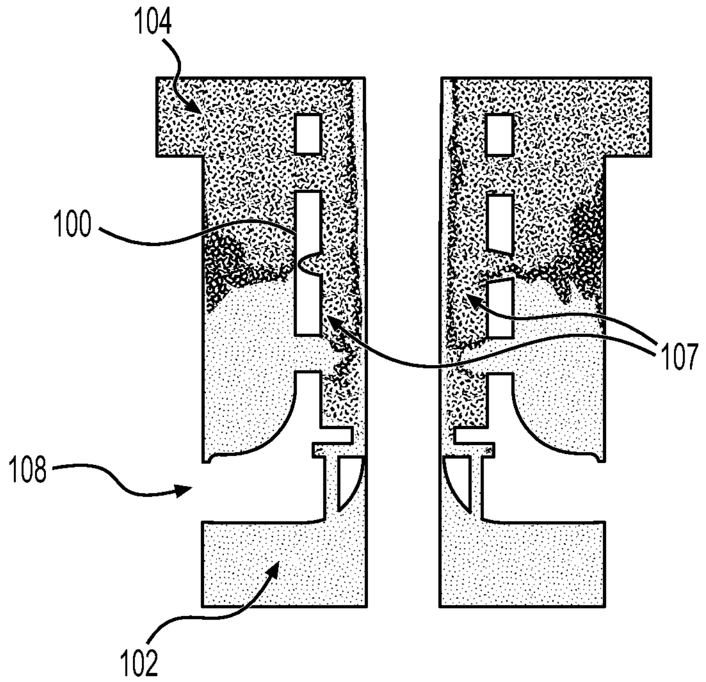
FIG. 1A PRIOR ART
FIG. 1A is a simplified view showing conventional gas and fluid flow associated with an inner channel of a standpipe of an aircraft landing gear during a compression phase.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Landing gear in aircraft generally employ an oleo strut or shock absorber, in which a fluid is forced to flow between chambers by flowing through an orifice plate with openings. The resistance created by the fluid being incompressible provides a damping force during landing, thereby making the landing smoother. Prior to landing of the aircraft, the oleo strut is unweighted and in a fully extended position. When the wheels of the landing gear touchdown, the strut undergoes compression, wherein fluid is forced from one chamber to another as the aircraft's weight and downward momentum are absorbed. After landing, the strut undergoes partial extension as the downward momentum is reduced and/or removed. After the aircraft takes off again, the wheels are unweighted, and the strut can return to full extension.

During the compression stage, hydraulic fluid is forced through openings of the orifice plate with a high velocity, which in turn creates one or more areas of low pressure around a stream of the hydraulic fluid. In some landing gear, the hydraulic fluid and gas are not separated, and gas, such as nitrogen, may flow through the low-pressure region faster than hydraulic fluid, wherein the gas will flow toward an orifice plate during a compression phase. When the landing gear changes direction from compression to extension during landing, the flow direction is reversed and any nitrogen near the orifice plate will then flow through the plate instead of hydraulic fluid which reduces the rebound damping force of the landing gear. Accordingly, it is desirable to provide a solution to restrict gas flow to the orifice plate to improve rebound damping of landing gear.

FIG. 1A demonstrates conventional fluid and gas movement during a compression stage. As shown, hydraulic fluid 102 is forced through orifice plate 108. This creates low pressure areas 107, allowing for gas 104 to flow toward the orifice plate 108.

Figure 1B:
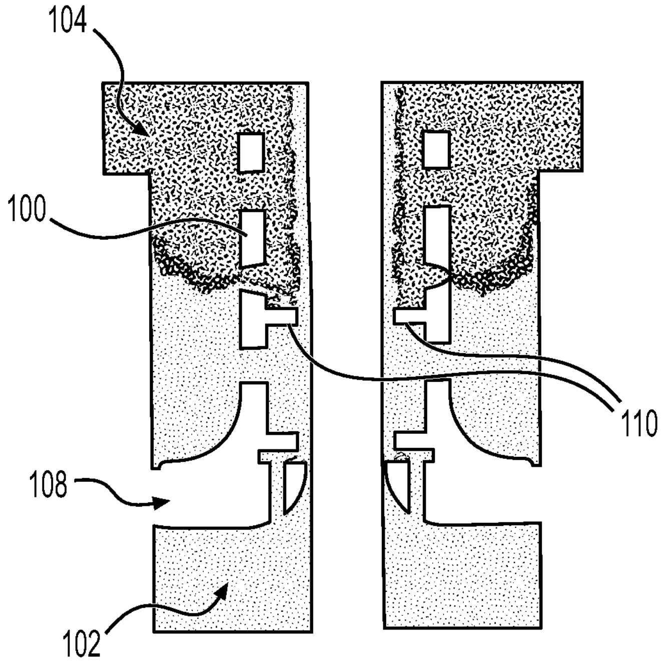
FIG. 1B is a simplified view showing gas and fluid flow associated with an inner channel of a standpipe of an aircraft landing gear having a gas backflow restrictor of the present invention during a compression phase.

The present invention aims to solve the above problem by using a restrictor device to restrict gas flow to the orifice plate of the landing gear. The restrictor extends into an inner channel of the standpipe 100 and blocks at least some of the gas backflow. This is demonstrated in simplified form in FIG. 1B, where a restrictor 110 is provided. As shown, the restrictor 110 extends into the standpipe 100 to block some of the gas 104 from flowing toward the orifice plate 108 in the opposite direction of the high velocity hydraulic fluid stream. The restrictor 110 functions to improve rebound damping of the landing gear and therefore improve the overall strut. As will be discussed in greater detail, the restrictor 110 may be manufactured into the strut, or may be added after manufacturing into existing designs. In addition, the restrictor 110 may be modified as would be understood by those skilled in the art to fit a variety of strut designs and models.

Figure 2:
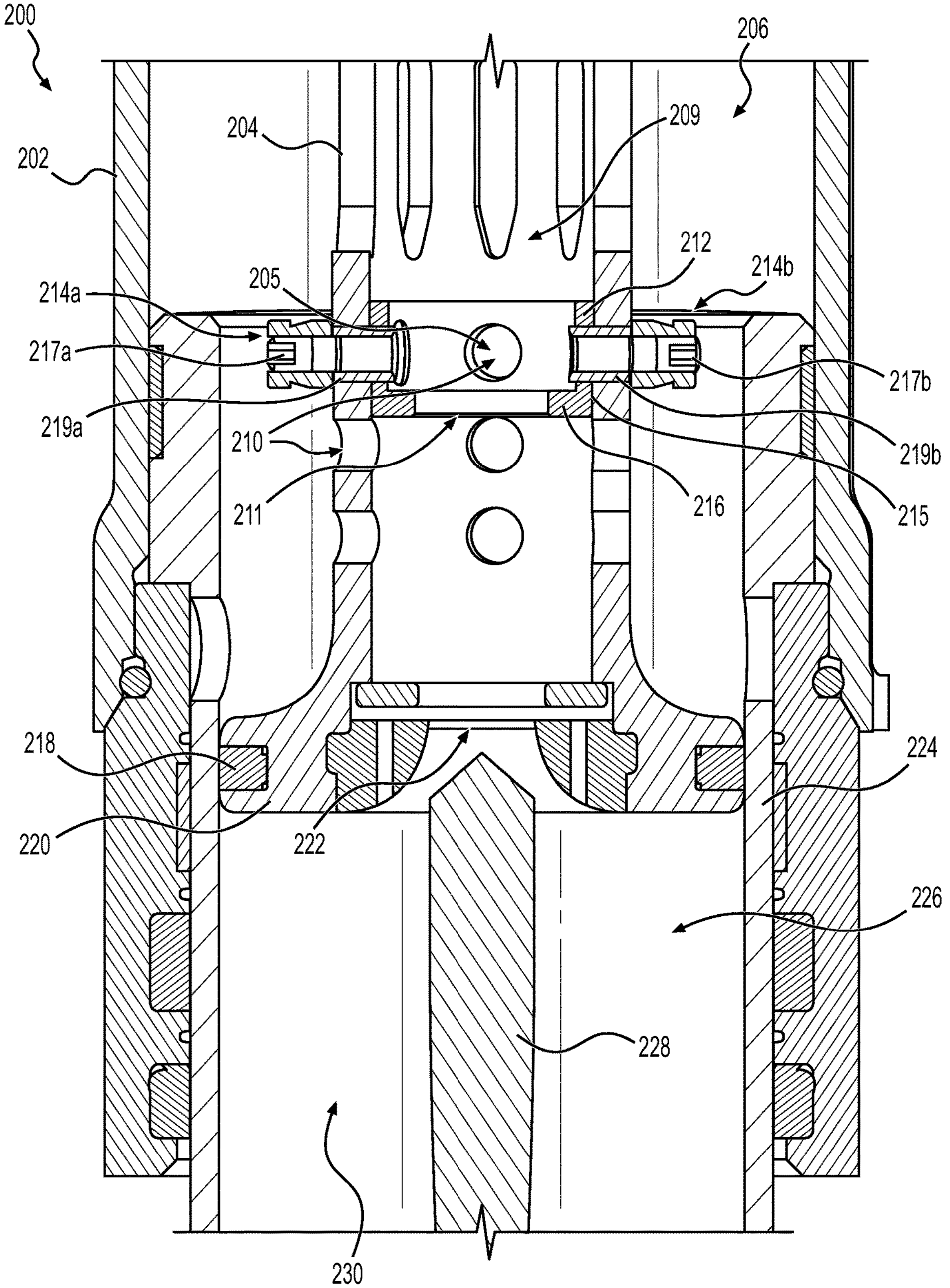
FIG. 2 is a cross-sectional view of a strut having an embodiment of a gas backflow restrictor in accordance with the present invention.
Figure 3:
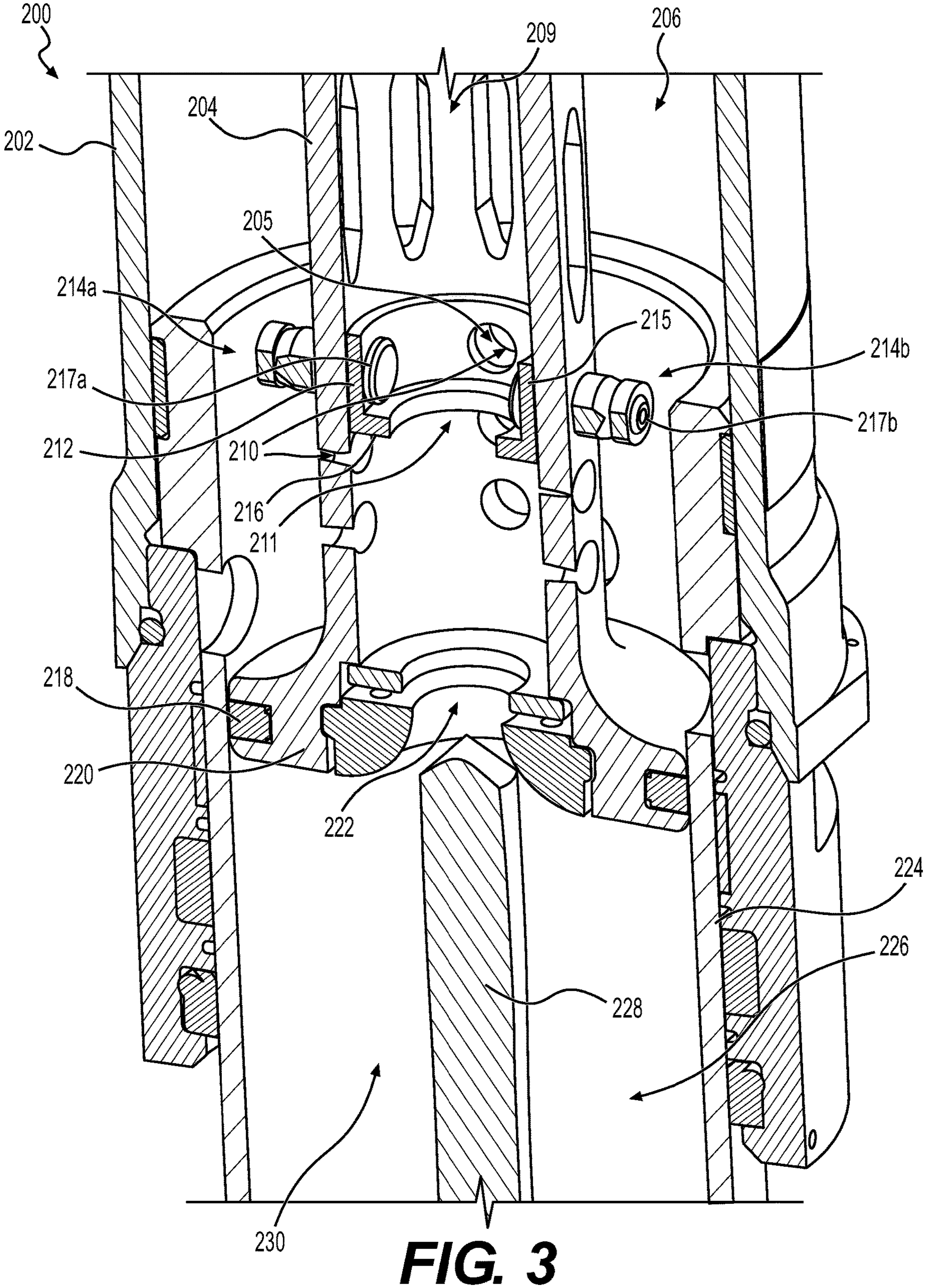
FIG. 3 is an angled, cross-sectional view of the strut with the gas backflow restrictor of FIG. 2.

FIGS. 2 and 3 illustrate cross-sectional views of an exemplary strut 200 with a gas backflow restrictor 212 in accordance with the present invention. In embodiments, strut 200 includes components conventional in the art. For example, strut 200 may include an inner cylinder 224 and an outer cylinder 202 aligned such that the inner cylinder 224 may slidingly engage with the outer cylinder 202 in a longitudinal direction. The cylinders 224, 202 create a first chamber 206 and a second chamber 226 for holding a hydraulic fluid 230. The flow of the hydraulic fluid 230 between the chambers 206, 226 is used to dampen the compression of the strut 200 during landing of the aircraft. Controlling the flow of the hydraulic fluid 230 between the chambers 206, 226 can be used to control resistance and therefore modulate the damping of movement of the inner cylinder 224 with respect to the outer cylinder 202. As the hydraulic fluid 230 is non-compressible, the displacement and flow rate between inner and outer cylinders 224, 202 determines the compression resistance of the strut 200.

Strut 200 further includes an orifice plate 220 which may include an exterior seal 218 between an exterior perimeter of the orifice plate 220 and the inner cylinder 224. The seal 218 may prevent fluid flow but allows for the orifice plate 220 to slidingly engage with the inner cylinder 224. The orifice plate 220 primarily functions to separate the first chamber 226 from the second chamber 206, and the orifice plate 220 may include one or more openings to provide fluid flow therethrough during the compression and extension phases of the strut. A standpipe 204 is attached to the orifice plate 220 and includes openings 210 to again allow fluid flow. In other words, one or more openings in the orifice plate 220 and standpipe 204 enable fluid coupling between the chambers 226, 206. When the strut 200 compresses or extends, hydraulic fluid 230 is forced from one chamber to the other through orifice plate 220, and the resistance to this flow creates the damping force.

In embodiments, as would be understood by those skilled in the art, a metering pin 228 is coupled to a first end (not shown) of the inner cylinder 224 and extends longitudinally along a central axis within the inner cylinder 224 and passes through a central port 222 of the orifice plate 220. As will be understood, the central port 222 and metering pin 228 are sized such that when the metering pin 228 extends through the central port 222, a flow path around the metering pin 228 remains open to allow hydraulic fluid to flow therethrough. In other words, the metering pin 228 does not block hydraulic fluid flowing through the central port 222. Other features of strut 200 that are known to one of skill in the art but are not described herein may be found in U.S. U.S. Pat. No. 11,204,075, filed Apr. 9, 2019, and U.S. patent application Ser. No. 18/170,247, filed Feb. 16, 2023, the disclosures of which are herein incorporated by reference in their entirety.

As previously discussed, during compression, the inner cylinder 224 may slidingly engage with the outer cylinder, 202, wherein hydraulic fluid is forced through the orifice plate 220, thereby providing shock absorption. Hydraulic fluid will flow out of central port 222 with high velocity which can create areas of low pressure around the stream of hydraulic fluid. According, in order to reduce gas flow toward the orifice plate 220, the restrictor 212 may be added to the standpipe 204.

As shown, the restrictor 212 includes a tubal body 215 that fits within an inner channel 209 defined by an inner diameter of the standpipe 204. The body 215 may include one or more openings 205 that correspond to one or more openings 210 of the standpipe 204, providing for a location to secure the restrictor 212 to the standpipe 204. In embodiments, one or more connectors 214*a*-*b* extend through the corresponding openings to secure the restrictor 212 in place. It is contemplated that any means of connection understood by those skilled in the art could be used. In the embodiment shown, the connectors 214*a*-*b* include hi-lock fasteners 217*a-b* extending through the aligned openings with spacers 219*a-b* positioned in openings 210 of the standpipe 204 to ease installation of the hi-lock fasteners 217*a-b*.

The restrictor 212 includes a shelf 216 that extends inward from the tubal body 215. The shelf 216 extends into the inner channel 209 of the standpipe and at a position below at least some of the openings 210. In embodiments, the shelf 216 extends all around the inner diameter of the body 215, however it is contemplated that not all embodiments may require the shelf 216 to be continuous. The shelf 216 forms a central opening 211 having a diameter greater than a diameter of the central port 222 through the orifice plate. This ensures that the shelf 216 does not cause an obstruction or hinder operation of the strut. The flow area of the central opening 211 is larger than the flow area of the central port 222 so there is negligible damping added during compression while the flow area of opening 211 is small enough to restrict nitrogen backflow.

The shelf 216 is positioned vertically to maximize the volume of the hydraulic fluid below the shelf 216 when the strut 200 is in an extended position and creates a physical block in the area of low pressure created by the high velocity stream of hydraulic fluid, which in turn blocks at least a portion of gas from flowing toward the orifice plate 220. This improves rebound damping associated with the strut 200. As discussed, the restrictor 212 may be adapted or modified for various models of struts, and may be added after manufacturing of the strut 200 or during manufacturing.

Figure 4:
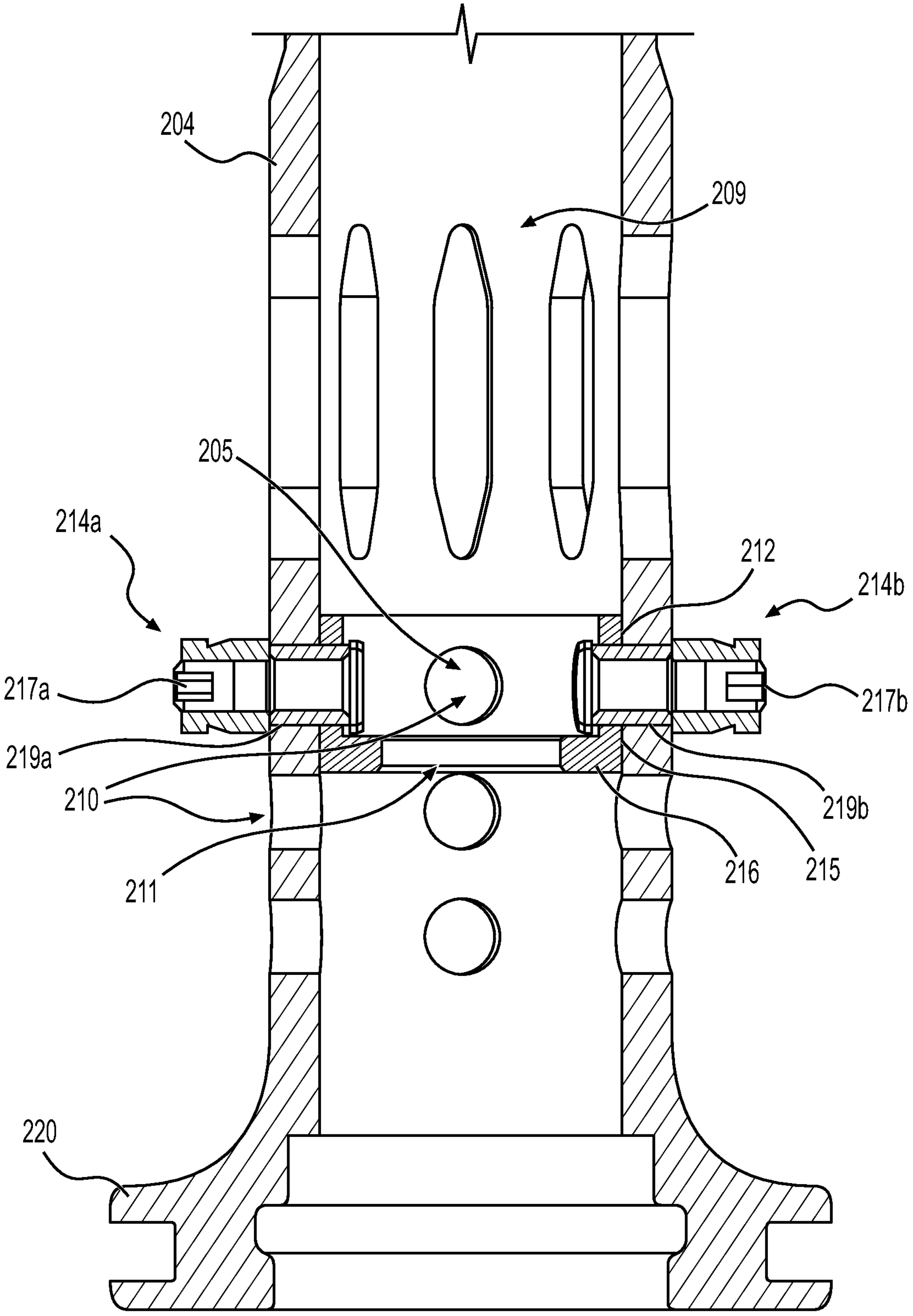
FIG. 4 is a cross-sectional view of a standpipe and the gas backflow restrictor of the strut of FIG. 2.
Figure 5:
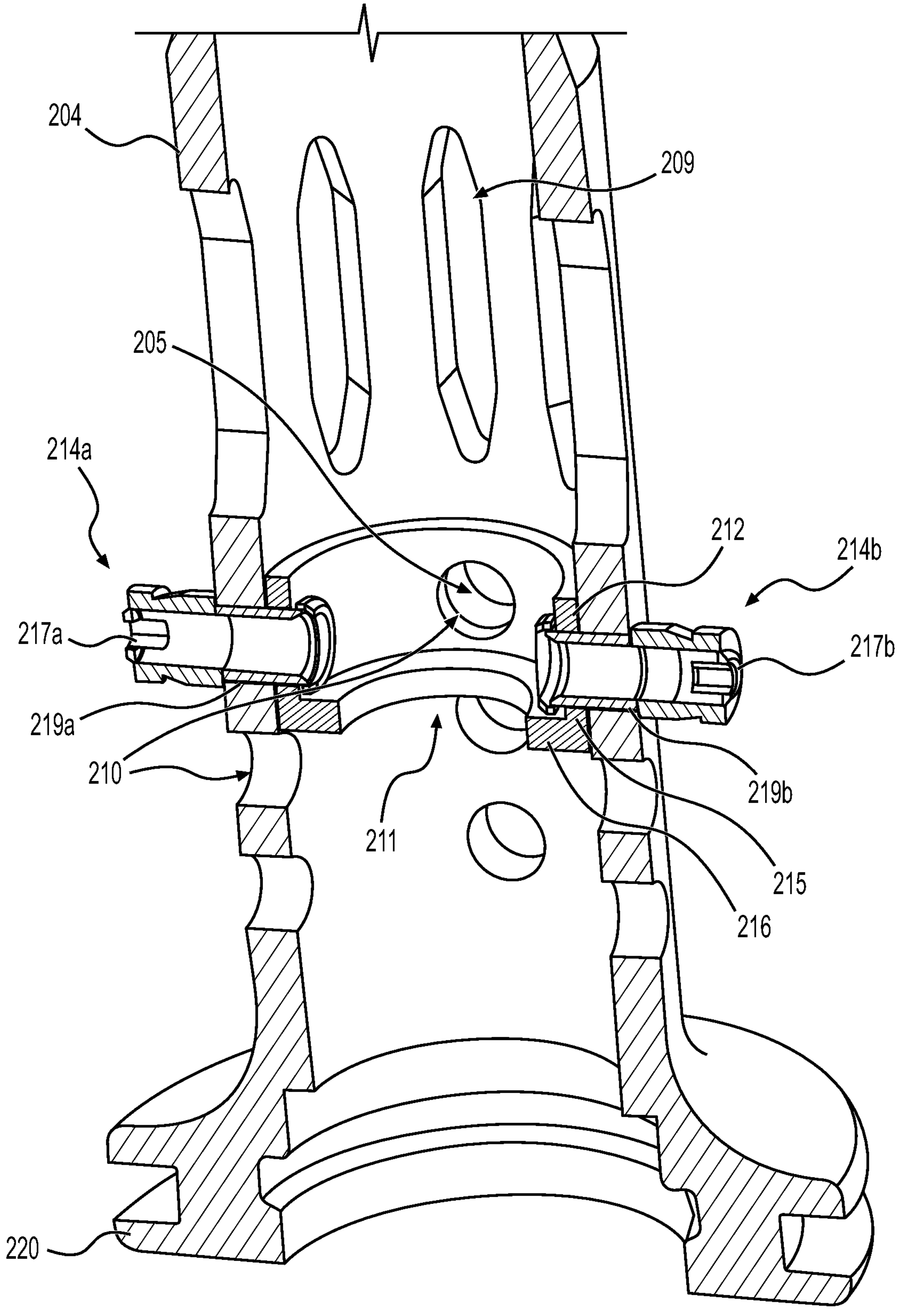
FIG. 5 is an angled, cross-sectional view of the standpipe and gas backflow restrictor of the strut of FIG. 2.

FIGS. 4 and 5 show additional cross-sectional views of the standpipe 204 and restrictor 212. Again, the restrictor body 215 fits within the inner channel 209 of the standpipe 204 such that the shelf 216 protrudes into the inner channel 209. The shelf 216 restricts gas flowing toward the orifice plate 220. The restrictor 212 is secured in place by the connectors 214*a-b*.

In alternative embodiments, the restrictor may be designed into a standpipe and include a shelf attached directly to the standpipe to block gas backflow. In other words, the restrictor may be just a shelf attached to the standpipe, such as during manufacturing of the standpipe.

Figure 6:
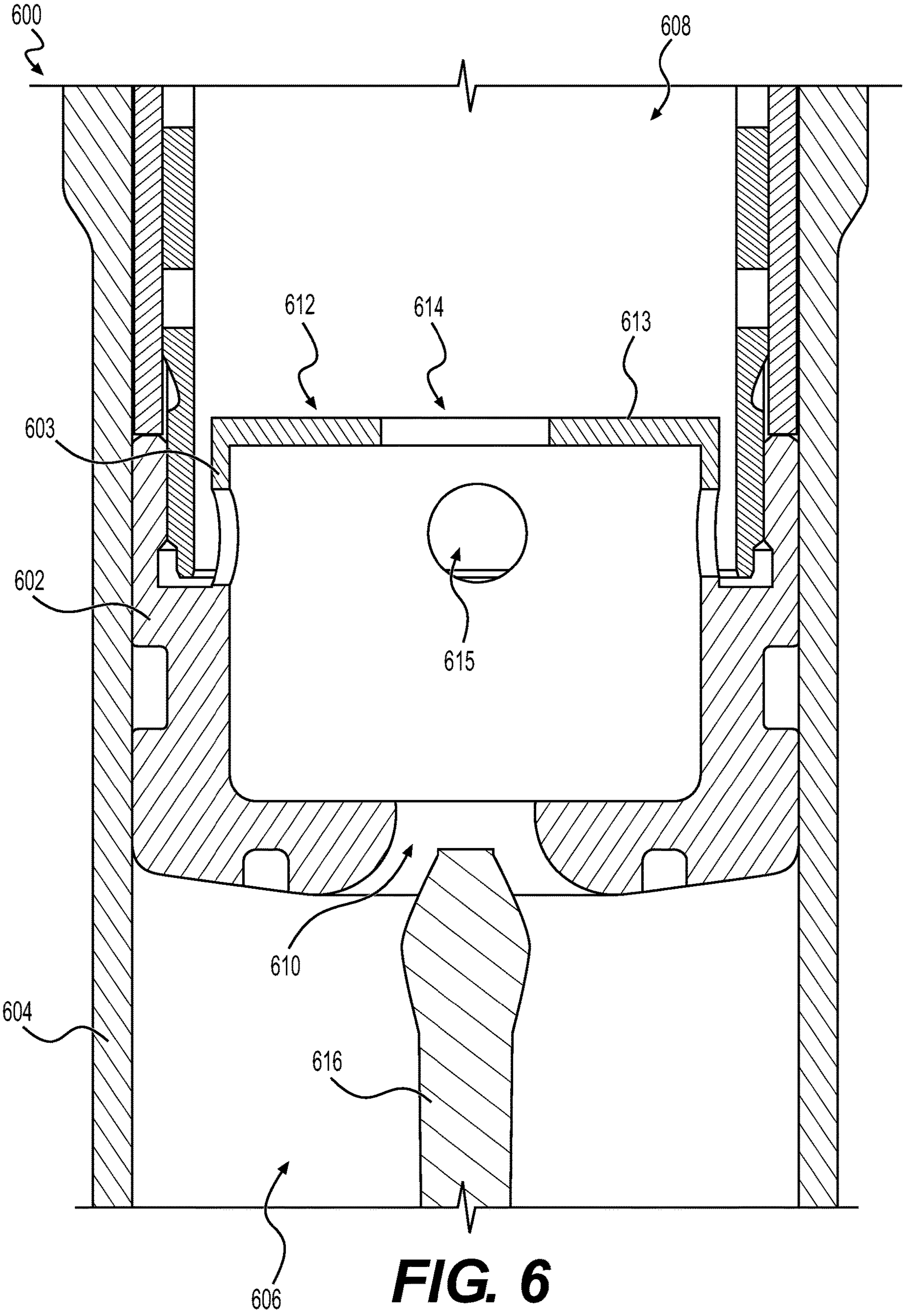
FIG. 6 is a cross-sectional view of an alternative embodiment of a strut having a second embodiment of a gas backflow restrictor in accordance with the present invention.

In FIG. 6 an alternative embodiment of a strut 600 is shown. Strut 600 includes components known in the art, such as an orifice plate 602 positioned within an inner cylinder 604 to separate a first chamber 606 and a second chamber 608. As discussed above, hydraulic fluid is forced from the first chamber 606 to the second chamber 608 through one or more openings, including a center port 610, creating resistance to force. A metering pin 616 extends through the cylinder 604 and center port 610. In this embodiment, a restrictor 612 is attached to and extends from the orifice plate 602, as opposed to a standpipe. The restrictor 612 includes a vertical body 603 that extends upward from the orifice plate 602 and a shelf 613 forming a central opening 614, which in embodiments is larger than center port 610. The orifice plate 602 and restrictor 612 may be manufactured as a single entity, or alternatively may be separate components secured together. A plurality of openings 615 extend through the restrictor 612 to allow fluid to flow therethrough. The shelf 613 is positioned within chamber 608 at a vertical position to physically block gas backflow toward the orifice plate 602, which improves rebound damping of the strut 600.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A gas backflow restrictor system as part of an aircraft strut, the system comprising:
  - the strut defining an inner volume having a first chamber and a second chamber;
  - an orifice plate positioned within the inner volume and separating the first chamber and the second chamber;
  - a standpipe attached to the orifice plate and extending longitudinally within the inner volume, the standpipe having a plurality of openings extending through a thickness of a wall forming the standpipe, the standpipe further defining an inner channel; and
  - a restrictor mounted within the inner channel, the restrictor having a shelf extending into the inner channel and forming a central opening;
  - wherein the shelf is configured to reduce gaseous flow through one or more of the plurality of openings of the standpipe and toward the orifice plate.

2. The system of claim 1, wherein the restrictor further comprises:
  - a body mounted to the standpoint within the inner channel via one or more connectors; and
  - the shelf extending inward from the body to form the central opening.

3. The system of claim 2, wherein the one or more connectors extend through corresponding openings of the standpipe and the restrictor.

4. The system of claim 3, wherein the one or more connectors each further comprises a spacer connected to the body of the restrictor and extending through a restrictor opening and a standpipe opening to engage with a hi-lock fastener, thereby securing the restrictor to the standpipe.

5. The system of claim 2, further comprising:
  - the orifice plate defining a central port having a first diameter; and
  - the central opening of the restrictor having a second diameter;
  - wherein the first diameter is less than the second diameter.

6. The system of claim 5, further comprising a metering pin extending longitudinally within the first chamber, the metering pin configured to extend through the central port and the central opening, wherein the metering pin extending through the central opening does not restrict fluid flow therethrough.

7. The system of claim 1, wherein the strut further comprises an inner cylinder and an outer cylinder.

8. A combination of an orifice plate and a gas back flow restrictor as part of an aircraft strut, the combination comprising:
  - the orifice plate positioned within a cylinder of the aircraft strut and separating a first chamber from a second chamber; and
  - the gas backflow restrictor coupled to the orifice plate and positioned above the orifice plate within the cylinder, the gas backflow restrictor having a shelf extending inwardly to create a central opening;
  - wherein the shelf is configured to reduce gaseous flow toward the orifice plate during a compression phase of the aircraft strut.

9. The combination of claim 8, wherein the gas backflow restrictor further comprises one or more openings extending through a thickness of a body portion of the gas backflow restrictor, the one or more openings allowing for fluid to flow therethrough.

10. The combination of claim 8, wherein the orifice plate further comprises a central port configured to allow a metering pin to extend therethrough.

11. The combination of claim 10, wherein the central port has a diameter smaller than the central opening.

12. The combination of claim 8, wherein the orifice plate and the gas backflow restrictor are manufactured as a single entity.

13. A method of restricting gas backflow in an aircraft strut during rebound damping, the method comprising:

separating a first chamber of an inner volume from a second chamber of the inner volume within the aircraft strut with an orifice plate; and mounting a restrictor within the inner volume at a position above the orifice plate, the restrictor having a shelf extending inwardly and creating a central opening;

wherein, when the aircraft strut is in a compression phase, the restrictor reduces gaseous flow toward the orifice plate.

14. The method of claim 13, wherein mounting the restrictor further comprises mounting the restrictor to an inner channel of a standpipe, the standpipe extending longitudinally away from the orifice plate and having a plurality of openings extending through a thickness of the standpipe.

15. The method of claim 14, wherein mounting the restrictor further comprises extending one or more connectors through the standpipe and the restrictor.

16. The method of claim 13, wherein the orifice plate further comprises a central port and the shelf of the restrictor forms a central opening, the central opening having a diameter greater than the central port.

17. The method of claim 13, wherein the restrictor is attached to the orifice plate.

18. The method of claim 17, wherein the restrictor is mounted within the inner volume when the orifice plate is installed to separate the first chamber from the second chamber.

19. The method of claim 17, wherein the body of the restrictor extends longitudinally away from the orifice plate.

* * * * *